Norman R. Gibson &
Louis S. Bernstein,
INVENTORS

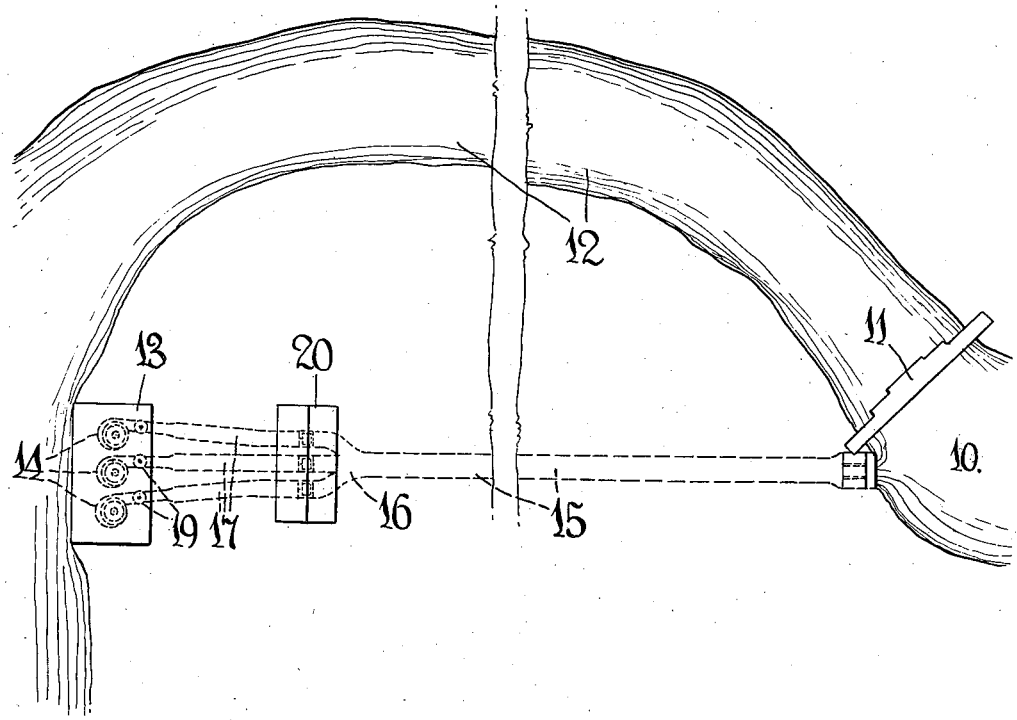
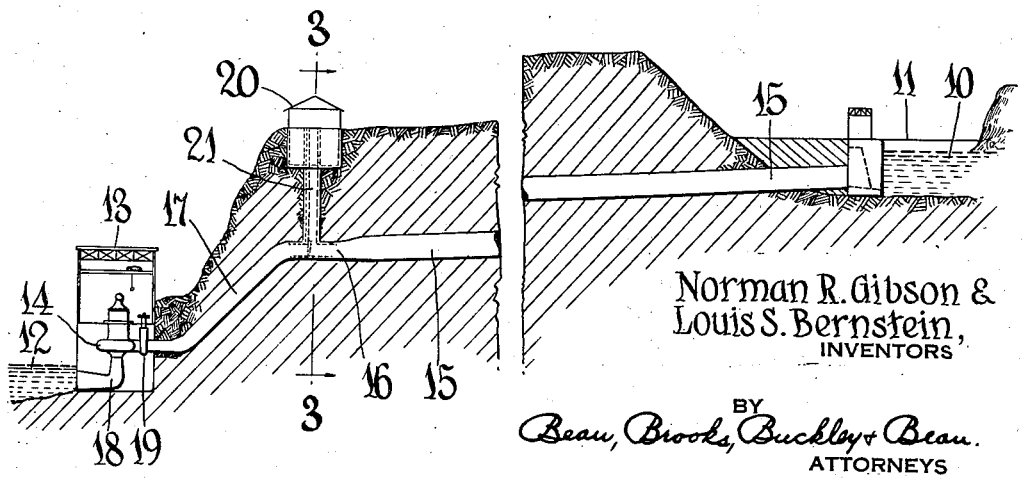

BY
Bean, Brooks, Buckley & Bean.
ATTORNEYS

Jan. 27, 1942.   N. R. GIBSON ET AL   2,271,480
HYDRAULIC PRESSURE SYSTEM
Filed Feb. 9, 1939   4 Sheets-Sheet 3
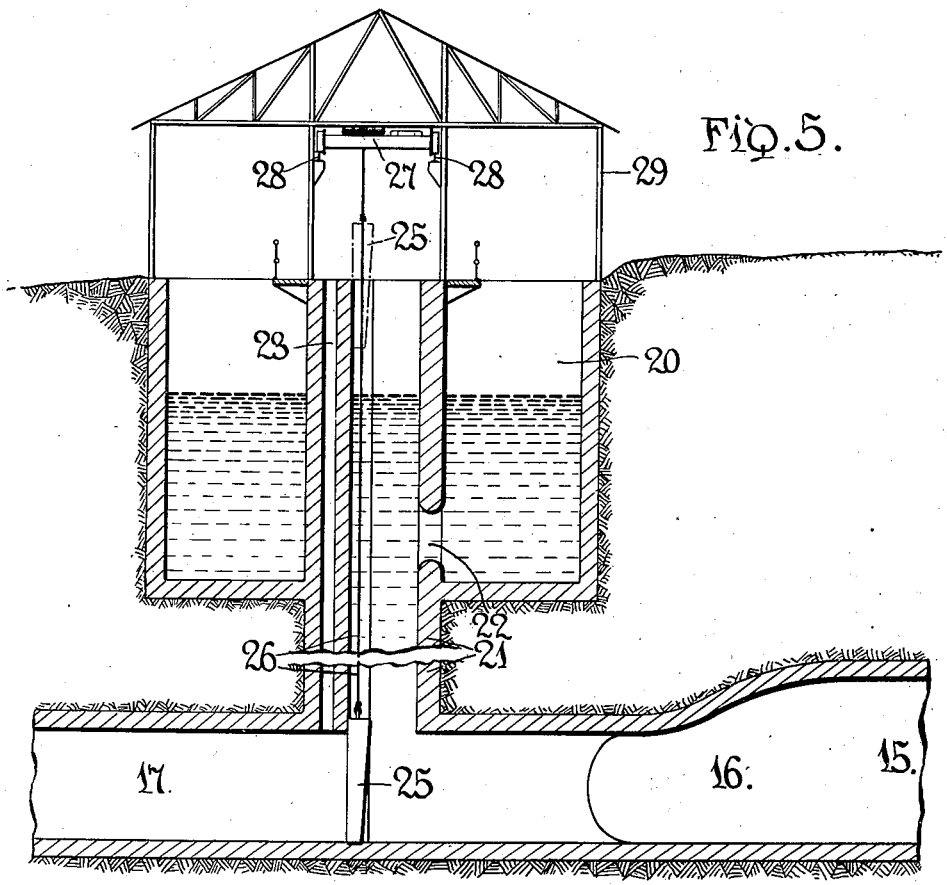
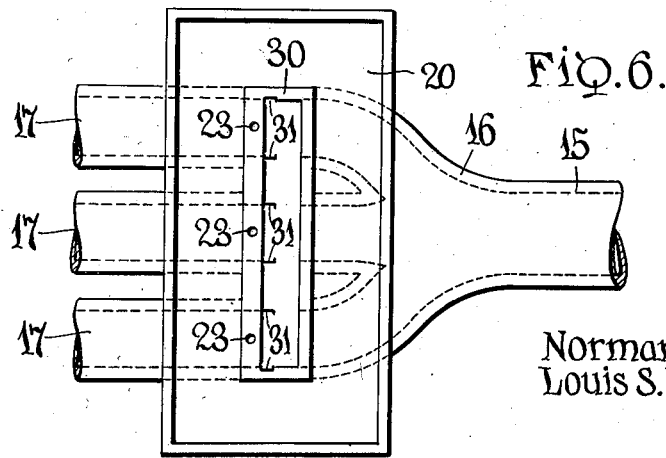
Norman R. Gibson &
Louis S. Bernstein,
INVENTORS
BY Beau, Brooks, Buckley & Beau
ATTORNEYS Jan. 27, 1942. N. R. GIBSON ET AL 2,271,480
HYDRAULIC PRESSURE SYSTEM
Filed Feb. 9, 1939 4 Sheets-Sheet 4
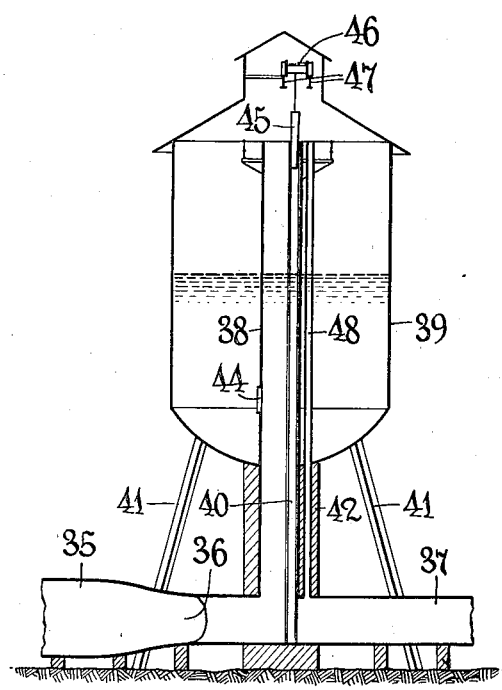
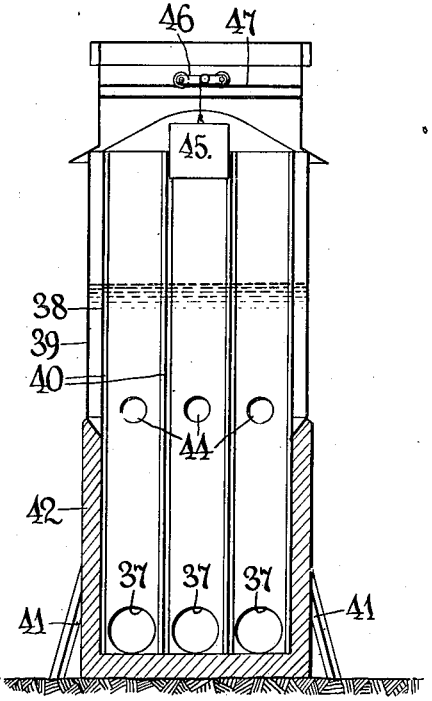
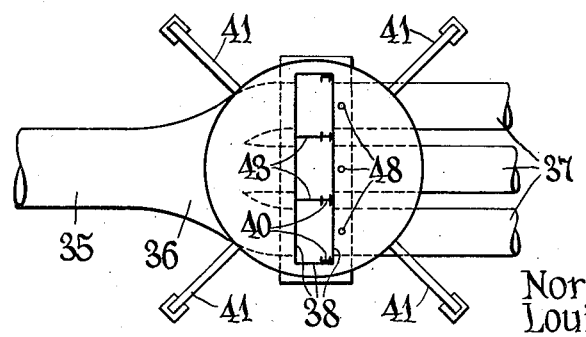
Norman R. Gibson &
Louis S. Bernstein,
INVENTORS
BY
Bean Brooks, Buckley & Bean.
ATTORNEYS Patented Jan. 27, 1942

2,271,480

UNITED STATES PATENT OFFICE 2,271,480

HYDRAULIC PRESSURE SYSTEM

Norman R. Gibson, Lewiston, and Louis S. Bernstein, Niagara Falls, N. Y., assignors to The Niagara Falls Power Company, Niagara Falls, N. Y.

Application February 9, 1939, Serial No. 255,538

11 Claims. (Cl. 61—19)

The present invention relates to improvements in water power systems wherein a long pipe line connects a source of water supply with a turbine station, and wherein plural turbines are employed, requiring a manifold in the pipe line upstream from the turbines. In such systems it is customary to provide a surge tank or basin upstream from the manifold to regulate flow of water through the pipe line and particularly to avoid sudden fluctuations in static head or pressure at the turbine end of the line incident to opening or closing the guide vanes or gates of the turbine, for controlling water flow therethrough.

Due to the relatively high hydrostatic pressures usually maintaining in such systems downstream from the surge tank, the manifold design and construction are difficult and expensive. When the valve at the entrance to one turbine requires repair, or when a turbine requires repair in an installation from which such a valve has been omitted, operation of the whole system must be stopped, this usually being effected by closing a gate valve located at the upstream end of the pipe line.

Furthermore, since the distance between the surge tank location and turbine location is preferably short, it is usually necessary that the manifold located between such locations be unsymmetrical. This greatly increases the difficulties in design and construction and also increases the cost.

The present invention contemplates an improved multiple riser or compound riser surge tank construction in a multiple turbine water power system, wherein the junction point of the manifold is located upstream from and preferably adjacent the surge tank and wherein the latter has riser means extending from the pipes which branch from the manifold. It further contemplates valve means associated with the risers, for closing one or another of the branch pipes against water flow, whereby such pipe, the turbine connected therewith, or a valve associated with the turbine, may be inspected or repaired without stopping water flow through other parts of the system. The resulting location of the manifold or distributor section of the pipe system is upstream of the surge tank where, in general, lower static pressures prevail. Only simple, single conduits need extend between the surge tank and turbines, which is usually the region of highest static pressures, and furthermore, in most installations the manifold construction may be made symmetrical. The present invention thereby decreases the problem of design, and the difficulties and costs of construction.

These and other objects and advantages will become apparent from the following description of the typical embodiments of the invention illustrated in the accompanying drawings, wherein:

Fig. 1 is a plan view of a water power system;

Fig. 2 is a vertical sectional view thereof;

Fig. 5 is a vertical section through the same structure, but taken at right angles to Fig. 3;

Fig. 6 is a plan sectional view similar to Fig. 4 but through a modified riser construction;

Figs. 7 and 8 are vertical sectional views, taken at right angles to each other, through another modified surge tank and riser construction; and, Fig. 9 is a plan view of the structure depicted in Figs. 7 and 8.

Figure 3:
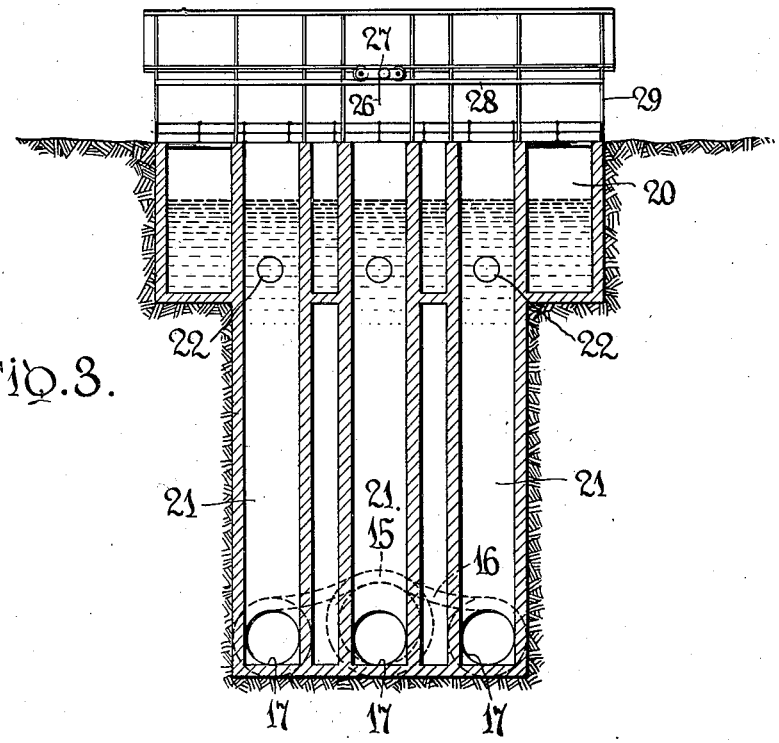
Fig. 3 is a vertical section, taken along line 3—3 of Fig. 2, through the surge tank and riser.

As shown in Figs. 1 and 2, a water power system of the present invention may include a source of water supply such as, for example, that indicated at 10, which is maintained by a dam 11 across stream or river 12 at a location far upstream from a turbine station 13. The latter may have a plurality of turbines 14 receiving water from source 10 through a long pipe 15, which has a manifold or distributor section 16 connecting pipe 15 to branch pipes 17, each of which leads to one of the turbines 14 whose discharge may be, as shown in the drawings, through draft tubes 18 into the stream 12. Flow of water to the turbines may be controlled by valves 19 in the branch pipes 17, and during operation, the flow of water through the turbines is regulated by turbine gates (not shown).

Figure 4:
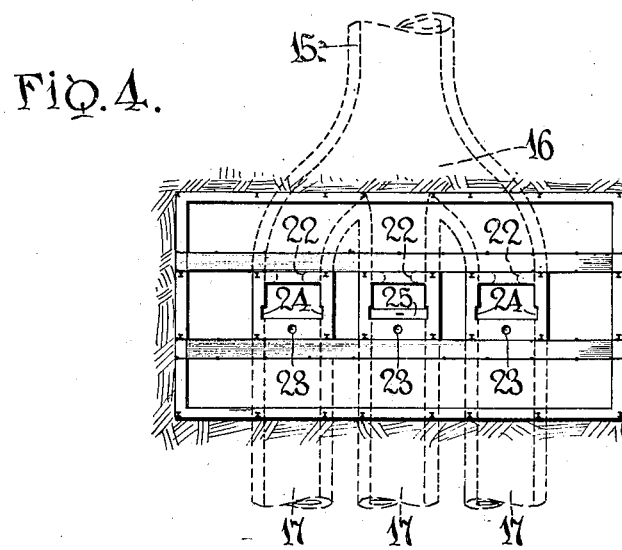
Fig. 4 is a plan sectional view of the structure shown in Fig. 3.

Adjacent manifold section 16 of the pipe is a surge tank 20 having risers 21 connecting the branch pipes 17 near the junction of the manifold. As shown in Figs. 3, 4 and 5 the risers 21 may be stand-pipes, of generally rectangular plan cross-section, usually extending above the maximum level of water within tank 20, and each having an opening 22 into the interior of tank 20. The capacity of the tank 20 and the size of the ports 22 will confine to definite limits the fluctuations in pressure incident to opening or closing of the turbine gates or during periods of acceleration or deceleration of flow through the pipe system, water being supplied during opening from tank 20 through the ports 22 to the lower parts of the pipe system, or being received by the tank from the pipe line during closing. The stand-pipe 21, whose water level will change at a rate different from that of tank 20 during such periods of acceleration or deceleration, serves to accelerate or decelerate quickly the large column of water in the pipe 15 and thereby to dampen out the oscillations which may occur when the rate of water flow through the turbines is suddenly changed.

Channels 24 are formed in the walls of each riser 21 for guiding a gate 25. The latter, supported by a cable 26, may be raised or lowered by a hoisting mechanism 27. When completely lowered the gate closes the one branch conduit 17 which it occupies, against water flow, to enable inspection or repair of the associated valve 19 or turbine 14, without interfering with water flow through the other branch conduits 17. The hoisting mechanism is preferably mobile on rails 28, supported by the building structure 29 which houses the tank 20, whereby when the gate 25 is fully withdrawn from one riser 21 it may be moved to and lowered in one of the other risers for valving the branch conduit 17 associated with such other riser.

In order to permit drainage of the section of a branch pipe 17 downstream from the gate 25, when the latter has been closed, atmospheric vents are provided for each branch pipe. In the structure shown in Figs. 4 and 5 the vents consist of openings 23 formed in the walls of risers 21.

Instead of employing multiple risers 21, one of which extends from each branch conduit 17 to the surge tank 20, a compound riser connecting all of the branch pipes to the tank may be used. Such structure is illustrated in Fig. 6 where the compound riser 30 appears in plan cross-section. Channel members 31 are provided in the riser for guiding a gate valve, for the same purpose as the channels 24 and gate 25 in the structure of Figs. 3 to 5 inclusive.

In the system illustrated in Figs. 1 and 2, where the manifold is far below ground, the surge tank as shown in Figs. 3, 4 and 5, and also as shown in Fig. 6, may be a concrete structure supported directly in the ground. Under other conditions, as for example, where the pipe line is above ground or close to the surface, the tank may have to be elevated. In Figs. 7, 8 and 9 such a structure is illustrated.

The conduit 35 from the source of water supply joins manifold section 36 from which branch conduits 37 extend. A metallic riser 38 connects to the branch conduits adjacent the junction point of the manifold, and extends upwardly through tank 39, which may be of metallic structure having supports 41. The riser 38 has an exterior reinforcing encasement 42. Partitions 43 divide the riser into a plurality of stand-pipes, one for each branch conduit, and each such stand-pipe opens through an orifice 44 into the interior of the tank.

Channel members 40 extend vertically along the walls of each stand-pipe for guiding a gate 45, for valving the branch conduits, and operated by a hoisting mechanism 46 which is similar to that indicated at 27 in Figs. 3 and 5. The hoisting mechanism may transverse rails 47, which are supported by the tank, in order that the gate may be used to close any one of the branch conduits 37.

A vent tube 48, rising to substantially the same elevation as riser 38, is provided for each branch conduit downstream of the gate 45, to enable drainage of the branch conduit when the gate is closed.

If desired, the walls 43 may be eliminated from the riser structure, whereby one multiple riser passage will serve to connect all of the branch pipes to the surge tank, instead of the multiple riser passages, one for each branch passage, as shown in Figs. 7 to 9 inclusive.

In addition to the advantages heretofore mentioned, it will be understood that in some installations the surge tank structures herein described may permit the elimination of valves 19 located immediately in advance of turbines 14, since one or more gate valves 25 may be operated in the riser structure to valve the flow of water through any or all of the turbines.

It will be understood further that the structures herein described are merely illustrative of the principles which may be embodied in structures having other physical characteristics without departing from the scope or spirit of the invention.

What is claimed is:

1. In a water power system, a pipe line connecting a source of water supply, a plurality of turbines fed through said pipe line, a manifold connected to the pipe line and having branches connected to said turbines, and a surge tank in said system located between the manifold junction and the turbines with each of the branches opening into the surge tank between the manifold junction and the turbines, and the surge tank serving to compensate for pressure fluctuations in any of said branches.

2. In a water power system, a pipe line connecting a source of water supply, a manifold connected to the pipe line, a plurality of turbines connected to branch pipes of said manifold, and a surge tank having a plurality of risers, said risers extending from said branch pipes downstream from the manifold junction.

3. In a water power system, a pipe line connecting a source of water supply, a manifold connected to the pipe line, and having branch pipes extending downstream therefrom, a plurality of turbines connected to said branch pipes, and a surge tank having a riser from said branch pipes downstream from the manifold junction.

4. In a water power system, a pipe line having a manifold having branches extending downstream therefrom, and regulating means comprising a surge tank having risers from the branches of said manifold opening into the branches downstream from the manifold junction.

5. In a water power system, a pipe line having a manifold having branches extending downstream therefrom, and regulating means comprising a surge tank having a riser extending from the branches of said manifold opening into the branches downstream from the manifold junction.

6. In a water power system, a pipe line connecting a source of water supply, a manifold connected to the pipe line, a plurality of turbines connected to branch pipes of said manifold, a surge tank having a plurality of risers, said risers extending from said branch pipes, and valve means associated with said risers for closing one of said branch pipes without stopping water flow through the other branch pipes.

7. In a water power system, a pipe line connecting a source of water supply, a manifold connected to the pipe line, and having branch pipes extending downstream therefrom, a plurality of turbines connected to said branch pipes, a surge tank having a riser from said branch pipes opening into said branch pipes downstream from the manifold junction, and valve means associated with said riser for stopping water flow through one of the branch pipes to the connected turbine without stopping water flow to the other turbine.

8. In a water power system, a pipe line having manifold branches, a surge tank disposed above said branches and having risers extending upwardly therefrom through said tank, gate means for obstructing the passage of water through said branches, and guide means for the gate means on the walls of said risers.

9. In a water power system, a pipe line having manifold branches, a surge tank disposed above said branches and having risers extending upwardly therefrom through said tank, a gate valve, vertical guides for said valve in each of said risers, and means above the latter for lowering said valve into any one of said risers to stop water flow through the associated branch.

10. In a water power system, a pipe line having manifold branches extending downstream from the manifold junction, a surge tank disposed above said branches and having a riser extending upwardly therefrom through said tank, the riser opening into the branches downstream from the manifold junction, a gate valve, and guide means in said riser for guiding said valve to and from positions closing one or another of said branches against water flow.

11. In a water power system, a pipe line having manifold branches extending downstream from the manifold junction, a surge tank disposed adjacent said branches and having riser means extending from said branches, the riser means opening into the branches downstream from the manifold junction, and gate means associated with said riser means for obstructing the passage of water through said branches.

NORMAN R. GIBSON.
LOUIS S. BERNSTEIN.